Patented Aug. 8, 1950

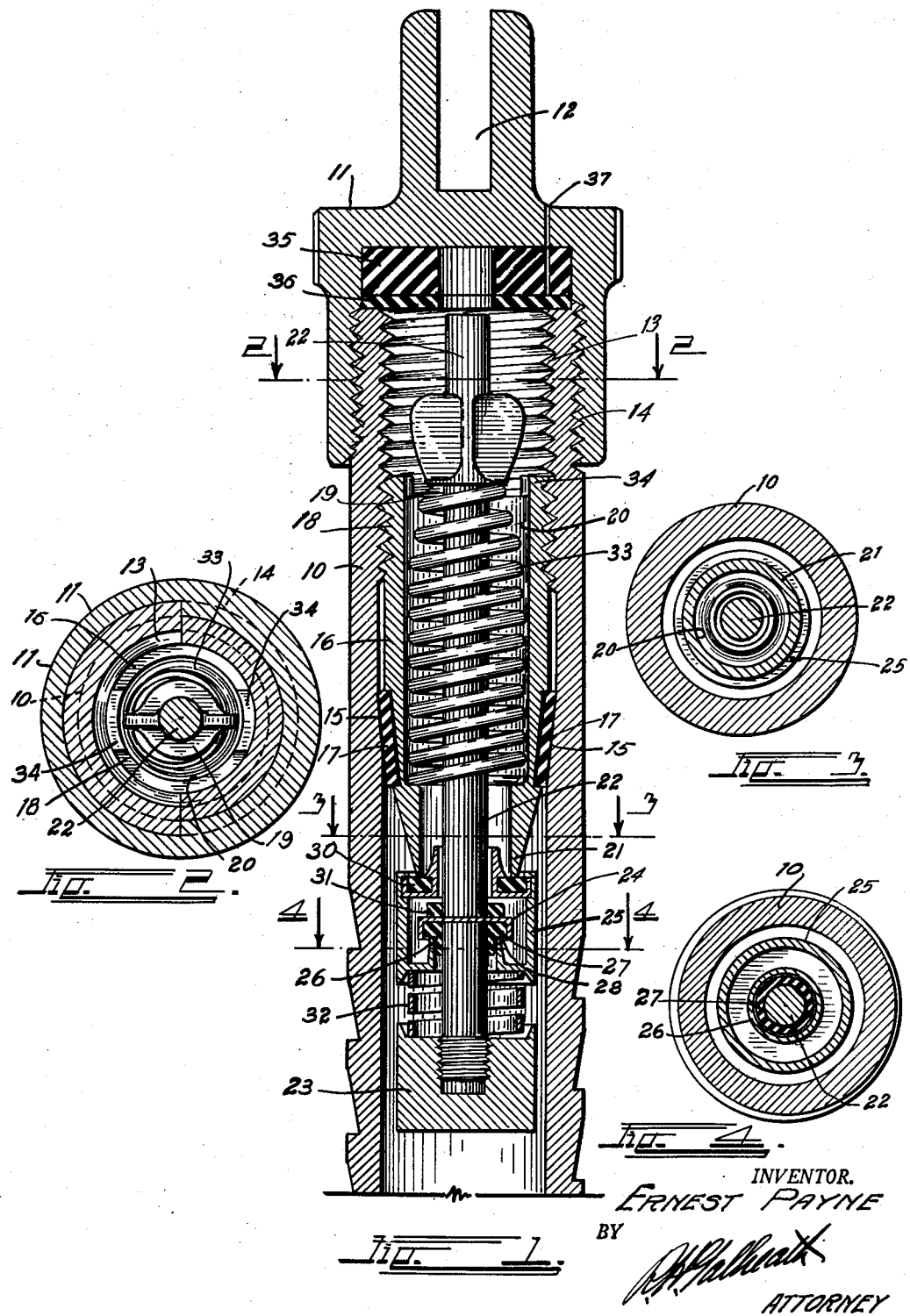

2,517,917

UNITED STATES PATENT OFFICE 2,517,917

TIRE RELIEF VALVE

Ernest Payne, Denver, Colo.

Application July 29, 1946, Serial No. 686,874

1 Claim. (Cl. 137—69.5)

Automotive tires are often accidentally overinflated, and if correctly inflated at a certain temperature, will become overinflated under rising temperatures, due to driving conditions or weather. This overinflation of the tire may result in damage to the carcass, and in older tires may result in actual road blowouts. This invention relates to a tire valve which will automatically relieve excess pressures in the tire.

The principal object of the invention is to provide a device of this character which can be quickly and easily installed in place of the conventional valve "insides" without requiring any change in the conventional valve.

Another object of the invention is to so construct the device that it may be installed with the usual valve cap as the only tool, and so that sudden and temporary rises in pressure, such as occasioned by uneven road conditions, collisions, etc., will not cause loss of air from the tire.

The improved regulating valve is designed more particularly as an improvement over the valve described and illustrated in applicant's copending application, Serial No. 638,033.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a highly magnified vertical section through a conventional pneumatic tire valve stem with the improved pressure relief valve in place therein; and Figs. 2, 3, and 4 are cross sections therethrough taken on the lines 2—2, 3—3, and 4—4, respectively, Fig. 1.

In the drawing a conventional tire valve stem is indicated at 10, with a covering cap 11. The cap 11 may be of the conventional design and provided with a socket-like wrench 12 for unscrewing the valve insides from the stem.

The conventional tire valve stem is provided with internal threads 13 for receiving the valve insides, and with external threads 14 for receiving the cap 11. The internal diameter of the upper portion of the stem 10 is larger than the internal diameter of the lower portion thereof, the two diameters being connected by a tapered portion 15.

The improved relief valve consists of a plug 16 having a sealing gasket 17 designed to seat against the tapered portion 15 and provided with external threads 18 engaging the threads 13. The plug is formed with an axial spring chamber 20 opening through its top and with a circular valve seat 21 on its bottom. The plug is provided with the usual bosses 34 for engagement by the wrench 12 of the cap 11.

A valve stem 22 extends throughout the length of the plug 16 and projects above and below the latter, terminating at its bottom in a terminal nut 23. The upper portion of the stem is flattened to provide a spring retaining seat 19.

An inverted, cup-shaped valve disc 24 is permanently formed on or secured to the stem 22 below the valve seat 21. A tubular valve cage 25 surrounds the disc 24. The cage is provided with an upwardly extending annular relief valve seat 26 on its interior. A stepped relief valve gasket 27 is fitted into the disc 24 and extends into the seat 26 at its bottom, there being a shoulder 28 provided for sealing the seat 26.

A check valve gasket 30 is mounted in a receiving ring fixed in the top of the cage 25 and seats against the valve seat 21. A restraining gasket 31 is mounted on top of the disc 24 and seats against the bottom of the receiving ring.

The cage 25 is constantly urged upwardly by means of a relief valve spring 32 which is compressed between the bottom of the cage 25 and the terminal nut 23. This upward action maintains the seat 26 against the shoulder 28 of the relief valve gasket 27.

The valve stem 22 is constantly urged upwardly in the plug 16 by means of a check valve spring 33, the upper extremity of which acts against the spring retaining seat 19 on the stem 22, and the lower extremity of which acts against the bottom of the spring chamber 20 of the plug 16. The action of the spring 33 is to force the check valve gasket 30 against the seat 21.

The fit between the lower portion of the relief valve gasket 27 and the interior of the valve seat 26 is not air tight, so that the former may slide easily within the latter and so that air may slowly leak from the tire when the shoulder 28 is away from the seat 26.

Operation

Let us assume that the tire is being inflated. The incoming air will pass around the valve stem 22 through the spring chamber 20 against the check valve gasket 30, forcing the latter downwardly against the action of the spring 33, thence will flow around the cage 25 into the tire. When the incoming air ceases, the spring 33 will pull the gasket 30 against the seat 21, sealing the valve.

Should the pressure in the tire be in excess of a pre-determined pressure, it will act against the gasket 27 to lift the shoulder 28 from the valve seat 26. Due to the fact that the gasket 27 extends within the valve seat 26, it does not completely open, however, but causes a slow leak at this point, allowing the air to slowly escape upwardly around the stem 22 until the excess pressure is relieved sufficiently to allow the relief valve spring 32 to again bring the shoulder 28 into sealing contact with the valve seat 26.

Should the pressure in the tire suddenly rise, for instance, due to the tire striking an obstruction, this sudden rise in pressure will force the gasket 27 upwardly until the restraining gasket 31 seals the outlet from the cage 25 around the stem 22, preventing the escape of air until normal conditions are restored in the tire.

For the convenience of description the location of the various parts of the improved relief valve have been referred to in the specification and claims by the directions "up" and "down." It is to be understood that these directions refer to the position of the valve on the drawing, since in use the valve will assume infinite angular positions.

The cap 11 is provided with a bleed opening 37 extending through the cap and through a conventional gasket 35 contained therein. The bleed opening allows the excess air released by the release valve to escape. When the release valve feature is not desired, such as in winter when there are but slight variations in temperature, an auxiliary sealing gasket 36 may be placed in the cap 11 to seal the bleed opening 37.

While a specific form of the improvement has been described and illustrated herein, it is desired to be understood that the same may be varied, within the scope of the appended claim, without departing from the spirit of the invention.

Having thus described the invention, what is claimed and desired secured by Letters Patent is:

A combined relief and check valve for pneumatic tire valve stems comprising: a plug adapted to be inserted in said stem; a spring chamber formed in said plug and opening through the top thereof; a valve stem passage opening through the bottom of said plug from said spring chamber; a spring seating shoulder between said passage and said chamber; a valve stem extending through said plug and projecting from the top and bottom thereof; a spring-engaging projection formed on said stem above said plug; a check valve spring positioned in said spring chamber on said shoulder, said spring surrounding said valve stem and engaging said projection to resiliently support said valve stem; a terminal nut on the lower extremity of said valve stem; a second spring resting on said nut; a valve cage supported by said second spring about said valve stem; a gasket on the top of said cage engaging and sealing said plug; a valve disc secured about said stem within said cage; a relief valve seat in the bottom of said cage; a relief valve gasket positioned between said disc and said seat and adapted to close said seat; and a stop gasket positioned between said disc and the top of said cage, said relief valve gasket having a portion extending into and partially sealing said seat.

ERNEST PAYNE.

REFERENCES CITED

The following references are of record in the file of this patent:

UNITED STATES PATENTS

| Number | Name | Date |
| --- | --- | --- |
| 1,172,477 | Mizener | Feb. 22, 1916 |
| 1,250,503 | Ray | Dec. 18, 1917 |
| 1,854,784 | Crowley | Apr. 19, 1932 |
| 2,124,844 | Boroughs | July 26, 1938 |
| 2,246,775 | Anderson | June 24, 1941 |